United States Patent
Lee et al.

(10) Patent No.: US 8,430,984 B2
(45) Date of Patent: Apr. 30, 2013

(54) COLLAPSIBLE MANDREL EMPLOYING REINFORCED FLUOROELASTOMERIC BLADDER

(75) Inventors: Michael A. Lee, St. Kent, WA (US); John D. Morris, Seattle, WA (US)

(73) Assignee: The Boeing Company, Chicago, IL (US)

( * ) Notice: Subject to any disclaimer, the term of this patent is extended or adjusted under 35 U.S.C. 154(b) by 344 days.

(21) Appl. No.: 12/777,610

(22) Filed: May 11, 2010

(65) Prior Publication Data
US 2011/0277918 A1  Nov. 17, 2011

(51) Int. Cl.
*B32B 37/00*  (2006.01)
(52) U.S. Cl.
USPC ............ 156/175; 156/169; 156/173; 156/425
(58) Field of Classification Search .................. 156/425, 156/169, 173, 175
See application file for complete search history.

(56) References Cited

U.S. PATENT DOCUMENTS

| | | | |
|---|---|---|---|
| 3,210,228 A * | 10/1965 | Bluck | 156/172 |
| 4,397,048 A * | 8/1983 | Brown et al. | 623/27 |
| 4,684,423 A * | 8/1987 | Brooks | 156/156 |
| 4,780,262 A | 10/1988 | VonVolkli | |
| 4,886,432 A | 12/1989 | Kimberlin | |
| 4,921,557 A * | 5/1990 | Nakamura | 156/169 |
| 5,013,514 A | 5/1991 | Azzani et al. | |
| 5,259,901 A | 11/1993 | Davis et al. | |
| 5,382,150 A | 1/1995 | Henrio | |
| 5,387,098 A | 2/1995 | Willden | |
| 5,425,628 A | 6/1995 | Pinckney et al. | |
| 5,463,957 A * | 11/1995 | Jensen et al. | 102/293 |
| 5,507,341 A | 4/1996 | Eslinger et al. | |
| 5,538,589 A | 7/1996 | Jensen et al. | |
| 5,605,195 A | 2/1997 | Eslinger et al. | |
| 5,645,668 A | 7/1997 | Lin et al. | |
| 5,772,950 A | 6/1998 | Brustad et al. | |
| 5,817,203 A * | 10/1998 | Moser | 156/155 |
| 6,031,212 A | 2/2000 | Westerman et al. | |
| 6,443,244 B1 * | 9/2002 | Collins | 175/61 |
| 6,692,681 B1 | 2/2004 | Lunde | |
| 6,979,807 B2 | 12/2005 | Anderson et al. | |
| 7,102,112 B2 | 9/2006 | Anderson et al. | |
| 7,189,345 B2 | 3/2007 | Sewell et al. | |
| 7,293,737 B2 | 11/2007 | Engwall et al. | |
| 7,357,166 B2 | 4/2008 | Pham et al. | |
| 7,527,759 B2 | 5/2009 | Lee et al. | |
| 7,708,546 B2 | 5/2010 | Lee et al. | |
| 2003/0146346 A1 * | 8/2003 | Chapman, Jr. | 244/123 |
| 2005/0035115 A1 | 2/2005 | Anderson et al. | |
| 2005/0035478 A1 | 2/2005 | Sewell et al. | |
| 2005/0242087 A1 | 11/2005 | Anderson et al. | |
| 2006/0108057 A1 | 5/2006 | Pham et al. | |
| 2006/0231981 A1 | 10/2006 | Lee et al. | |

(Continued)

OTHER PUBLICATIONS

Musch et al., "Tooling with Reinforced Elastomeric Materials," Composite Manufacturing, vol. 3, No. 2, 1992 Butterworth-Heinemann Ltd., 11 pages.

(Continued)

*Primary Examiner* — Jeff Aftergut
(74) *Attorney, Agent, or Firm* — Hanley, Flight & Zimmerman, LLC

(57) ABSTRACT

A collapsible mandrel comprises an inflatable bladder. The bladder includes a reinforcement sandwiched between inner and outer layers of a fluoroelastomeric rubber.

28 Claims, 8 Drawing Sheets

U.S. PATENT DOCUMENTS

2008/0131630 A1 6/2008 Schnelz
2009/0123588 A1 5/2009 Lee et al.
2009/0151867 A1 6/2009 Froeschner et al.
2010/0006739 A1 1/2010 Robins et al.

OTHER PUBLICATIONS

Baur et al., "6.23 Kautschuke," vol. 30, Dec. 1, 2007, 15 pages.
European Patent Office, "Search Report," issued in connection with application Serial No. 11162732.9, issued Nov. 15, 2011, 9 pages.

* cited by examiner

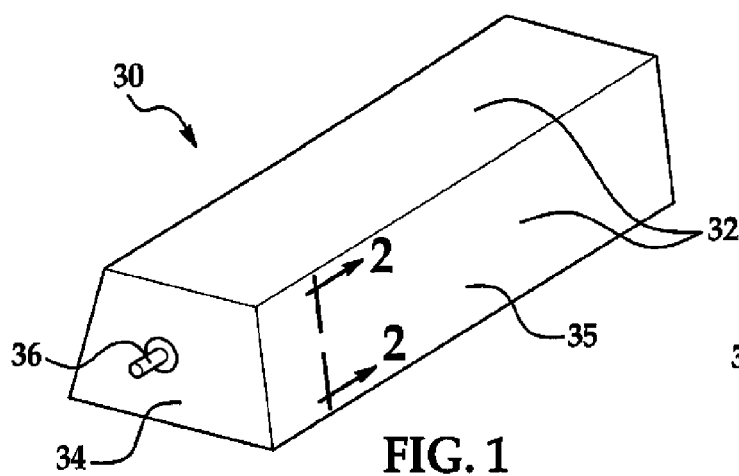
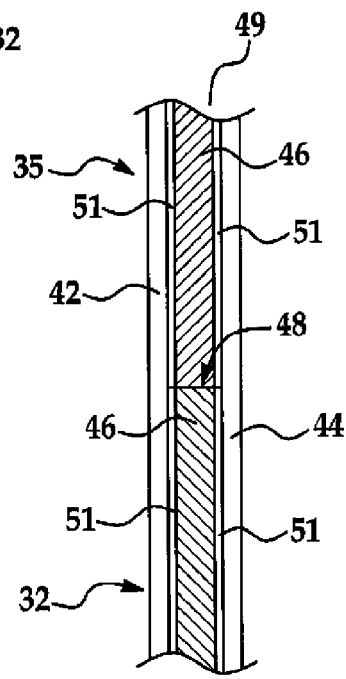
FIG. 1
FIG. 2
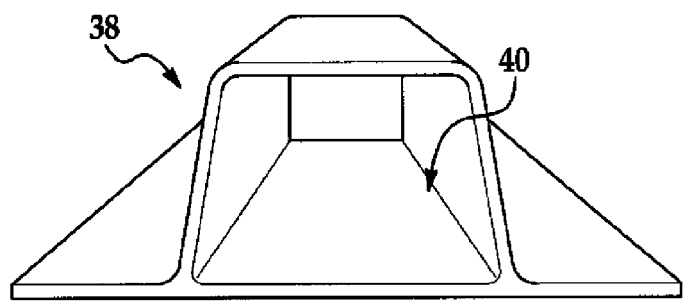
FIG. 3
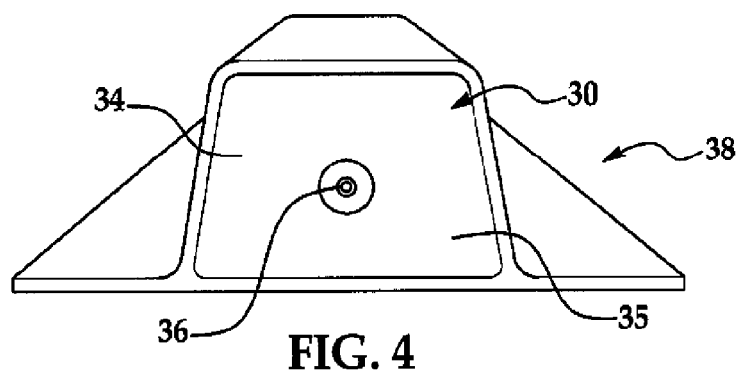
FIG. 4

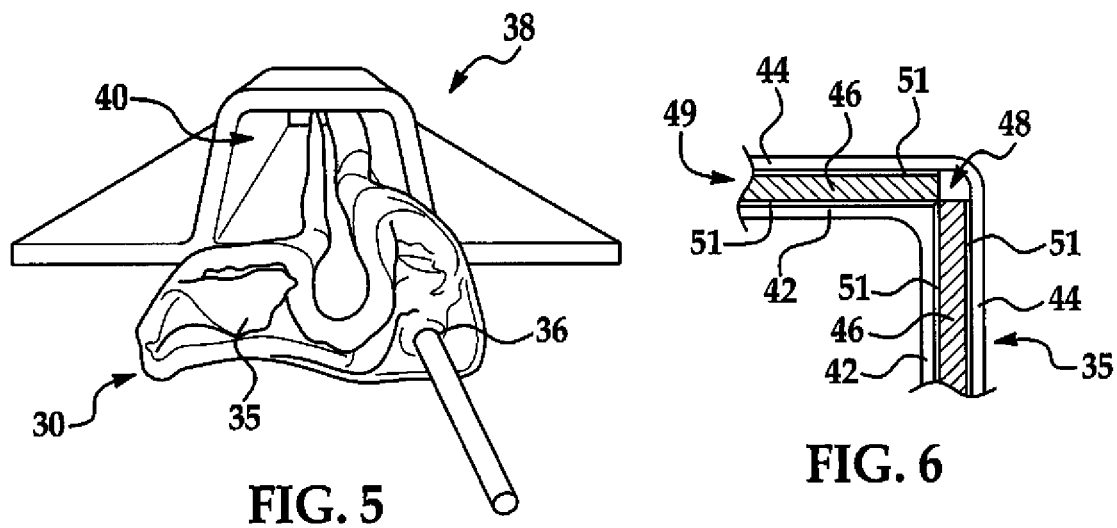
FIG. 5
FIG. 6
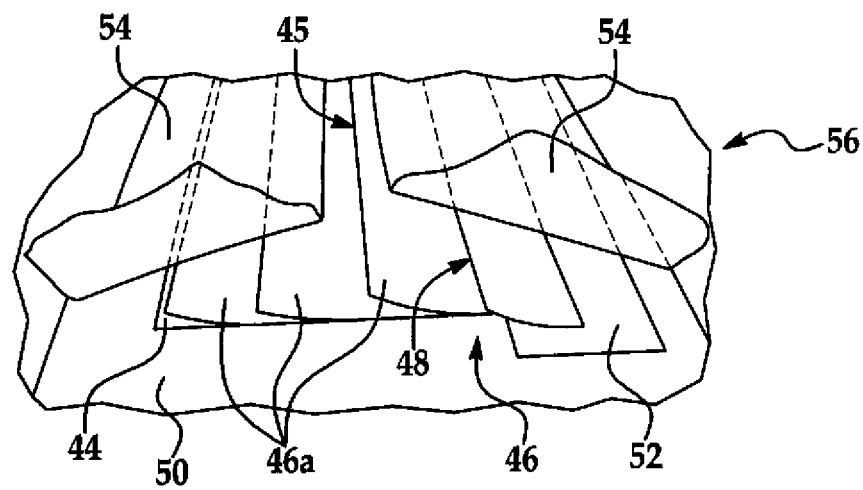
FIG. 7
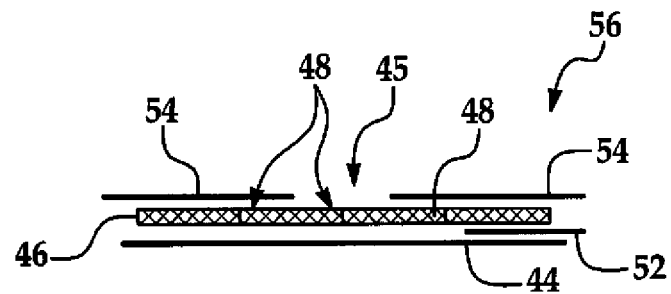
FIG. 8

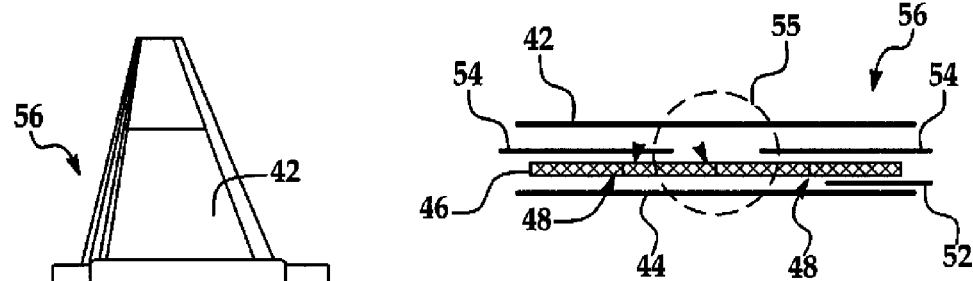
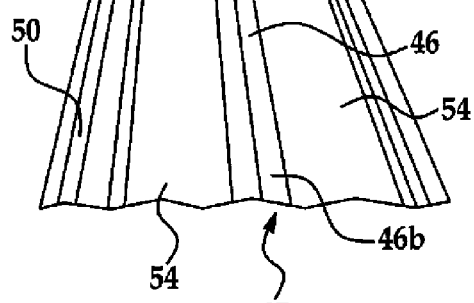
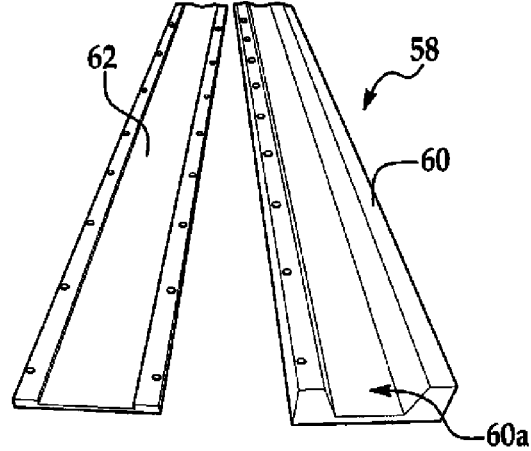
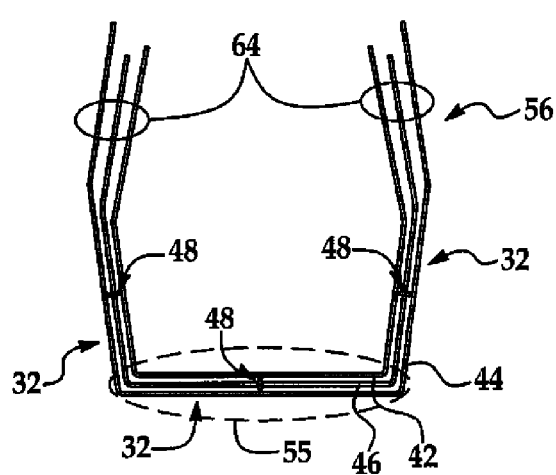
FIG. 10
FIG. 9
FIG. 11
FIG. 12

COLLAPSIBLE MANDREL EMPLOYING REINFORCED FLUOROELASTOMERIC BLADDER

TECHNICAL FIELD

This disclosure generally relates to mandrels on which parts may be formed, and deals more particularly with a collapsible mandrel employing a reinforced fluoroelastomeric bladder for laying up and/or curing composite parts.

BACKGROUND

Inflatable bladders are sometimes used as mandrels to produce fiber reinforced resin parts. Multiple plies of fiber reinforced resin are laid up over the mandrel in order to form the plies into the desired part shape. The mandrel may be removed from the layup after the layup is compacted or cured by collapsing the mandrel to reduce its cross sectional shape so that it can be withdrawn from the part.

In some applications, the ability of the bladder to apply pressure uniformly over the layup may be dependent on the bladder's dimensional stability. Maintaining dimensional stability of the bladder may be particularly problematic in the case of long tubular composite part layups.

One type of known mandrel used for layup and curing of composite parts employs a reinforced silicon rubber bladder, however this type of bladder demonstrates relatively rapid, continuous shrinking over time with repeated use and therefore may not provide uniform pressure during cure cycles. In the case of parts having relatively strict dimensional requirements, reinforced silicon rubber bladders may be used only once because of their inherent problems with thermal growth and post-cure shrinkage.

Another type of mandrel uses nylon tubular bagging film to provide autoclave pressure during curing to the internal cavity of a part. However, bagging film does not have the required structural strength and rigidity to support a part during the layup process.

Accordingly, there is a need for a collapsible mandrel exhibiting improved dimensional stability over repeated uses, and which possesses the necessary strength and rigidity to allow the mandrel to be used for part layup.

SUMMARY

The disclosed embodiments provide a collapsible mandrel and method for making the same comprising a reinforced fluoroelastomeric rubber bladder that may exhibit minimal shrinkage over repeated uses and which can be employed for use in multiple cure cycles, thereby lowering recurring tooling cost. The collapsible mandrel provides structure and support during green part layup and provides the proper shape and autoclave pressure during curing with minimal thermal expansion and virtually no post-cure shrinkage. The mandrel is capable of collapsing under applied vacuum for ease of extraction from an enclosed part. Improved dimensional control during part curing may be achieved due to a lower coefficient of thermal expansion (CTE) of the fluoroelastomeric rubber. The lower gas permeability rate of fluoroelastomeric rubber at elevated temperature may also contribute to improved part quality by reducing the possibility of porosities in the part.

The disclosed method may also reduce volatiles in the fluoroelastomeric rubber which may contribute to maintaining dimensional stability of the mandrel over repeated uses. The collapsibility of the mandrel allows parts to be laid up having complex profiles while preventing lock-in of the bladder within the part due to a varying part profile.

According to one disclosed embodiment, a collapsible mandrel is provided comprising an inflatable bladder. The bladder includes inner and outer layers of fluoroelastomeric rubber having a reinforcement sandwiched therebetween. The reinforcement may include a coating of fluoroelastomeric rubber thereon. The bladder includes collapsible sidewalls, and the reinforcement is discontinuous in each of the sidewalls. In one embodiment, the reinforcement comprises fiberglass. The reinforcement may include at least two generally rigid elongate members in each of the sidewalls arranged substantially edge-to-edge with each other.

According to another disclosed embodiment, a collapsible mandrel for laying up and curing composite parts is provided. The mandrel comprises a substantially flexible, pressurizable bladder adapted to inflate when pressurized. The bladder includes an inner layer of rubber, and outer layer of rubber, and a middle layer including a substantially rigid reinforcement that provides the bladder with rigidity when the bladder is pressurized and which collapses when the bladder is depressurized. The inner and outer layers of rubber are a fluoroelastomeric rubber, and the reinforcement is coated with a fluoroelastomeric rubber. The reinforcement includes fiberglass members arranged side-by-side to form flexible butt joints allowing the reinforcement to flex.

In accordance with still a further embodiment, a method is provided of making composite parts, comprising reinforcing a flexible bladder with substantially rigid strips. The method further includes inflating the bladder, and laying up a composite part over the reinforced inflated bladder. The bladder is deflated and removed either after the layup has been completed or after the layup has been cured. The bladder is deflated by using negative air pressure to collapse the sidewalls of the bladder along the edges of the reinforcement strips. Reinforcing the bladder may be performed by coating the strips with rubber and placing them in side-by-side relationship between two layers of rubber.

BRIEF DESCRIPTION OF THE ILLUSTRATIONS

FIG. 1 is an illustration of a perspective view of a collapsible mandrel according to the disclosed embodiments, shown in its fully inflated state.

FIG. 2 is an illustration of a sectional view taken along the line 2-2 in FIG. 1.

FIG. 3 is an illustration of an isometric view of a typical part that has been laid up and cured using the collapsible mandrel shown in FIG. 1.

FIG. 4 is an illustration similar to FIG. 3 but showing the mandrel installed and inflated within the part shown in FIG. 3.

FIG. 5 is an illustration of an isometric view similar to FIG. 4 but showing the mandrel having been collapsed and in the process of being removed from the part.

FIG. 6 is an illustration of a sectional view similar to FIG. 2 but depicting the sidewall having been partially collapsed.

FIG. 7 is an illustration of an isometric view showing a partially completed layup used to form the collapsible mandrel shown in FIG. 1.

FIG. 8 is an illustration of a sectional view of the layup shown in FIG. 7, but exploded to better show the relationship of the layers to each other.

FIG. 9 is an illustration of an isometric view of a layup similar to FIG. 7, but depicting the application of the inner layer of fluoroelastomeric rubber.

FIG. 10 is an illustration similar to FIG. 8 but showing the inner layer of rubber having been applied to the layup.

FIG. 11 is an illustration of an isometric view of a mold used to form the collapsible mandrel.

FIG. 12 is an illustration of a sectional view of the layup after it has been placed in the mold shown in FIG. 11, wherein the layers of the layup are exploded to better show their relationship to each other.

DETAILED DESCRIPTION

Figure 13:
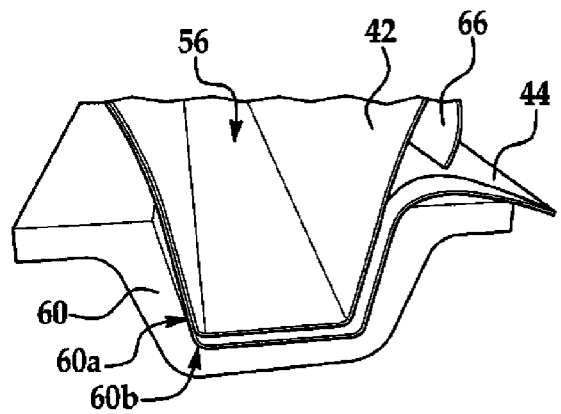
FIG. 13 is an illustration of a perspective view of the layup after it has been placed in the cavity of the mold shown in FIG. 11.

Referring first to FIGS. 1 and 2, the disclosed embodiments relate to a collapsible mandrel 30 which includes an inflatable, flexible bladder 35. The bladder 35 includes four sidewalls 32 and two endwalls 34, however the bladder 35 may have more or less than four sidewalls 32. The mandrel 30 also includes a pressure fitting 36 which is adapted to be coupled with a source (not shown) of pressurized fluid such as air for inflating the bladder 35, and with a vacuum source for deflating the bladder 35. In the illustrated embodiment, the mandrel 30 is elongate and possesses a generally trapezoidal cross section, however other cross sectional shapes are possible.

Referring particularly to FIG. 2, the walls 32 of the bladder 35 each comprise a middle layer 49 sandwiched between inner and outer layers 42, 44 respectively. Each of the inner and outer layers 42, 44 comprises a flouroelastic rubber, such as Vitron® which is readily commercially available. A fluoroelastomer is a special purpose fluorocarbon-based synthetic rubber that has wide chemical resistance and superior performance, particularly in high temperature applications. The fluoroelastomeric rubber has a relatively low coefficient of thermal expansion, thus providing the mandrel 30 with good dimensional stability. The thickness of the inner and outer layers of 42, 44 fluoroelastomeric rubber will depend upon the particular application. The middle layer 49 comprises a reinforcement which may include elongate strips of substantially rigid material, such as, for example and without limitation, a woven fiberglass having a coating 51 of fluoroelastomeric rubber on each side thereof. The fiberglass reinforcing strips 46 not only provide the mandrel 30 with structural rigidity, but also reduce the tendency of the bladder 35 to shrink over repeated uses.

As will be discussed later in more detail, the fiberglass reinforcement strips 46 are arranged side-by-side and edge-to-edge to form a butt joints 48 between the strips 46. The butt joints 48 function as hinges that allow the reinforcement strips 45 to be swing and fold angularly with respect to each other when the mandrel 30 collapses. The design and location of the butt joints 48 allow the bladder 35 to collapse under negative air pressure or vacuum in a predictable manner, enabling easier extraction of the bladder 35 from the part. The thickness of the coatings 51 may depend upon the application, as well as the exact material makeup of the reinforcement strips 46 and their surface finishes. The coatings 51 aid in bonding the reinforcement strips 46 to the inner and outer layers 42, 44 of fluoroelastomeric rubber.

Referring now also to FIGS. 3 and 4, when inflated, the reinforced collapsible mandrel 30 may be used as a tool for laying up a composite part such as the elongate, generally tubular composite part 38 which includes a relatively long tubular opening 40. In the illustrated embodiment, the opening 40 has a trapezoidally shaped cross section, substantially matching that of the mandrel 30. By virtue of the reinforcement strips 46, the mandrel 30 possesses sufficient rigidity to remain dimensionally stable while multiple plies (not shown) of composite material are laid up over the sidewalls 32 of the mandrel 30 during the layup process. The mandrel 30 may optionally be used to maintain the shape of the part 38 while it is being cured using autoclave processing or other curing techniques.

Referring to FIGS. 5 and 6, following the layup and/or curing process, the mandrel 30 may be removed from the part 38 by deflating the bladder 35 using negative pressure to draw fluid (e.g. air) from the bladder 35 through the pressure fitting 36. As the bladder 35 deflates, negative pressure within the bladder 35 causes the endwalls 34 and sidewalls 35 to flex inwardly as shown in FIG. 5, collapsing and drawing away from the part 38. As the bladder 35 begins to deflate and collapse, adjacent pairs of the reinforcement strips 46 fold relative to each other along their mutual edges at joints 48, as shown in FIG. 6. With the bladder 35 partially collapsed, as shown in FIG. 5, the mandrel 30 may be pulled from the tubular interior 40 of the part 38.

The collapsible mandrel 30 may be made according to a method that will now be described with reference to FIGS. 7-24. Referring first to FIGS. 7 and 8, a layup 56 is formed on a suitable substrate 50 by first laying down a layer 44 of fluoroelastomeric rubber. Next, strips 46 of fiberglass cloth or other reinforcement are laid down on top of the rubber layer 44, in aligned, edge-to-edge contact forming butt joints 48. The reinforcement strips 46 are coated with fluoroelastomeric rubber prior to being laid down on the rubber layer 44. A strip of release film 52 is interposed between an outer edge of the rubber layer 44 and one of the reinforcement strips 46. Two strips of release film 54, which may comprise FEP, are placed on top of the fiberglass strips 46, in spaced apart relationship to each other, leaving a portion 45 of the reinforcement strips 46 exposed. Due to the relative tackiness of the rubber coating 51 and the rubber layer 54, the reinforcement strips 46 adhere to the rubber layer 44, except in the area of the release film 52.

Next, as shown in FIGS. 9 and 10, a layer 42 of fluoroelastic rubber is placed on the layup 56, overlying the release film 54 and the exposed portion 46a of the reinforcement strips 46. Due to the presence of the release film 54, the rubber layer 42 adheres to the reinforcement strips 46 only along the exposed portion 46a. Thus, the area in which both the inner and outer rubber layers 42, 44 are bonded to the reinforcement strips 46 is limited to that shown by the numeral 55 in FIG. 10. The layup 56 shown in FIG. 10 may then be laminated by vacuum bag processing at elevated temperature to laminate the rubber layers 42, 44 to the reinforcement strips 46.

Referring now to FIGS. 11, 12 and 13, following the lamination process, the layup 56 may be placed in the cavity 60*a* of a mold 60 forming part of a tool assembly 58 that includes a lid 62. Forming aids (not shown) may be used to press the layup 56 down into the mold cavity 60*a*, and conform the layup 56 to radii 60*b* (FIG. 13) in the mold cavity 60*a*. At this point, as shown in FIG. 12, the release film 52, 54 (FIG. 10) has been removed and the area of full lamination 55 between the reinforcement 46 and the inner and outer layers 42, 44 respectively, lies along the bottom of the mold cavity 60*a*. Three of the butt joints 48 between the reinforcing strips 46 are respectively positioned roughly in the middle of three corresponding sidewalls 32, and the outer free ends 64 of the layup 56 extend outside of the mold 60, acting as flaps.

Figure 14:
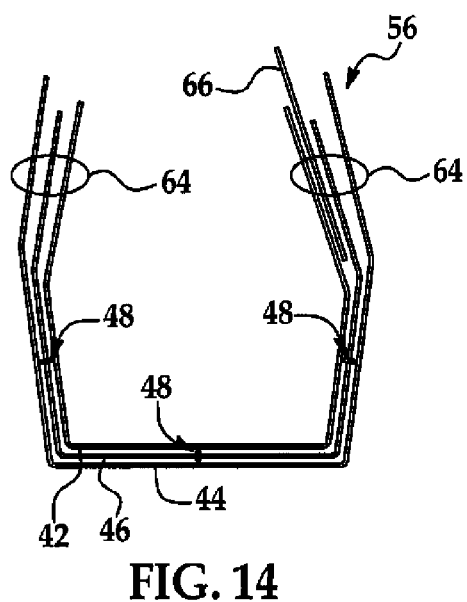
FIG. 14 is an illustration similar to FIG. 12, but showing a release film having been placed between the reinforcement and the inner layer.
Figure 15:
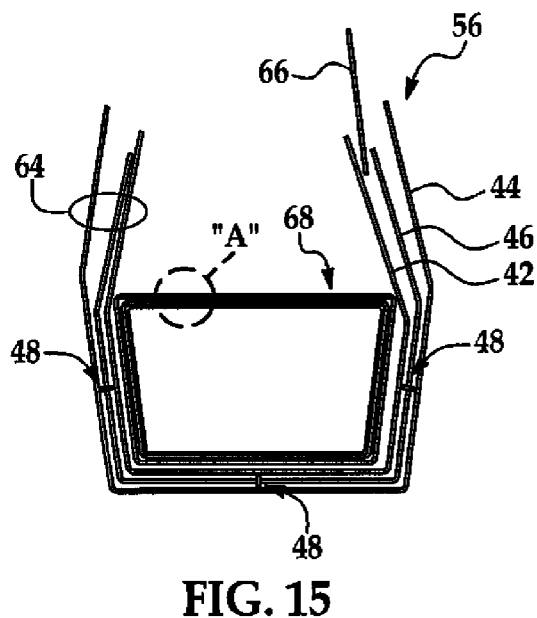
FIG. 15 is an illustration similar to FIG. 14, but showing a forming mandrel having been placed in the partially formed layup.
Figure 16:
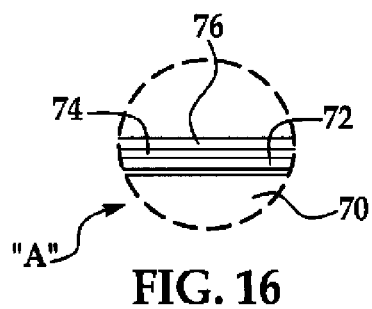
FIG. 16 is an illustration of a sectional view of the area designated as "A" in FIG. 15.

Next, as shown in FIGS. 13 and 14, a strip of release film 66 is inserted between an edge of the reinforcing strips 46 and the rubber layer 42, following which, as shown in FIG. 15 a forming mandrel 68 is inserted into the mold cavity 60*a* and placed on top of the partially formed layup 56. At this point, the release film 66 is removed. As best seen in FIG. 16, the forming mandrel 68 may comprise a core 70 of memory foam which is covered by a nylon cure tube bag 72, a thin breather 74 and a layer of release film (e.g. FEP) 76.

Figure 17:
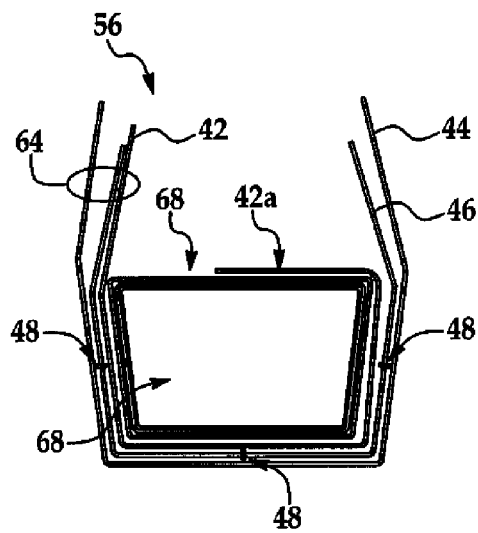
FIGS. 17-20 are illustrations of sectional views of the layup depicting successive steps in the assembly method.
Figure 18:
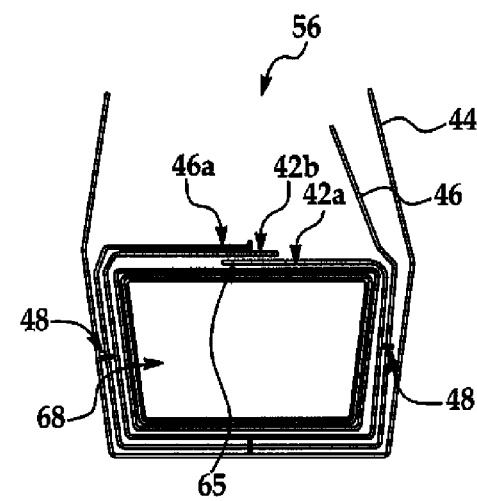
Figure 19:
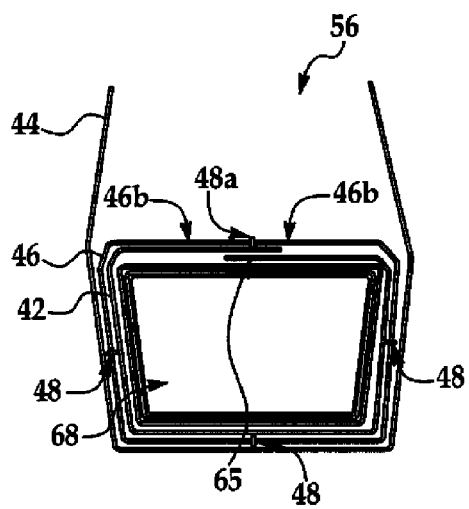
Figure 20:
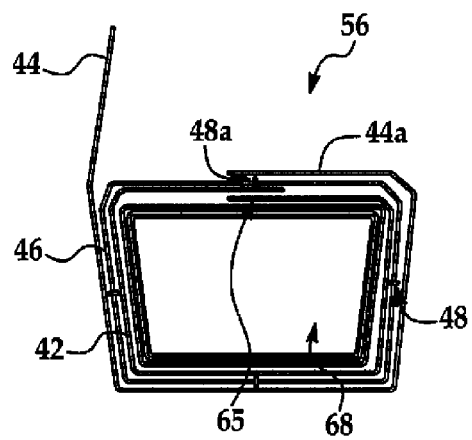
Figure 21:
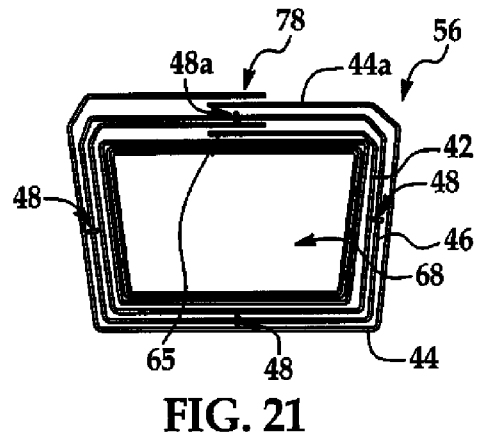
FIG. 21 is an illustration of a sectional view of a fully assembled layup having the forming mandrel installed therein.

Next, as shown in FIG. 17, flap 42*a* forming part of the inner layer 42 is folded over onto the forming mandrel 68, following which, as illustrated in FIG. 18, flaps 42*b* and 46*a* are folded over onto the flap 42*a* resulting in an overlap joint 65. Then, as shown in FIG. 19, flap 46*b* is folded over onto a portion of flap 32*b*, resulting in a butt joint 48*a* between the ends of two of the reinforcing strips 46. Next, as shown in FIG. 20, flap 44*a* is folded over onto the reinforcement, overlapping the butt joint 48*a*. Finally, as shown in FIG. 21, flap 44*b* is folded over onto 44*a* resulting in a second overlap joint 78.

Figure 22:
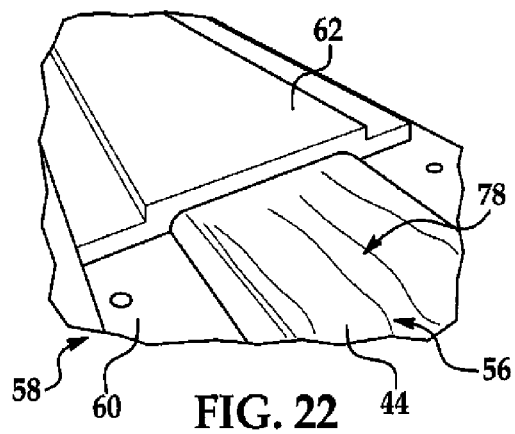
FIG. 22 is an illustration of a perspective view of the mold shown in FIG. 11, wherein the layup has been fully assembled and the lid has been placed on the mold in preparation for vacuum bagging.
Figure 23:
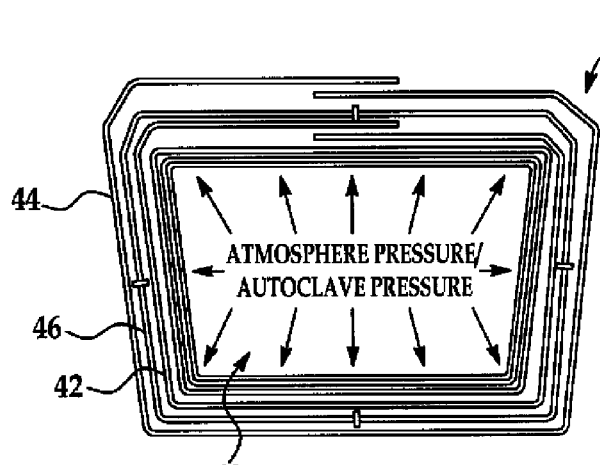
FIG. 23 is an illustration similar to FIG. 21 but showing the pressure applied by the forming mandrel to the layup during the compaction and curing process.
Figure 24:
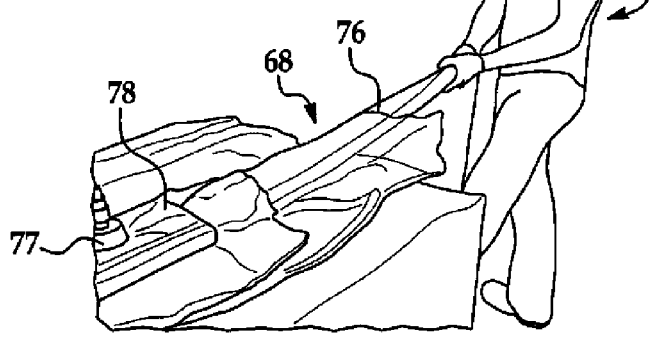
FIG. 24 is an illustration of a perspective view showing a person removing the forming mandrel from the cured layup.

Referring to FIG. 22, with the various flaps having been closed, the mold 60 may be closed by installing the lid 62, following which the entire tool assembly 58 may be vacuum bagged (not shown) and subjected to a vacuum and/or autoclave pressure, as shown in FIG. 23 which results in compacting and curing the layup 56. Vacuum bag processing of the bladder 35 aids in removing volatiles from the rubber which tends to increase dimensional stability and/or resists shrinkage of the mandrel 30 over multiple uses. Following compaction and curing, as shown in FIG. 24, the forming mandrel 68 may be removed from the layup 56 by applying a vacuum to the bagged memory foam core 70 which causes the core 70 to collapse. Once collapsed, a person 79 may grasp an end of the release film 76 and pull the mandrel 68 through one end of the fully cured part layup 56.

Figure 25:
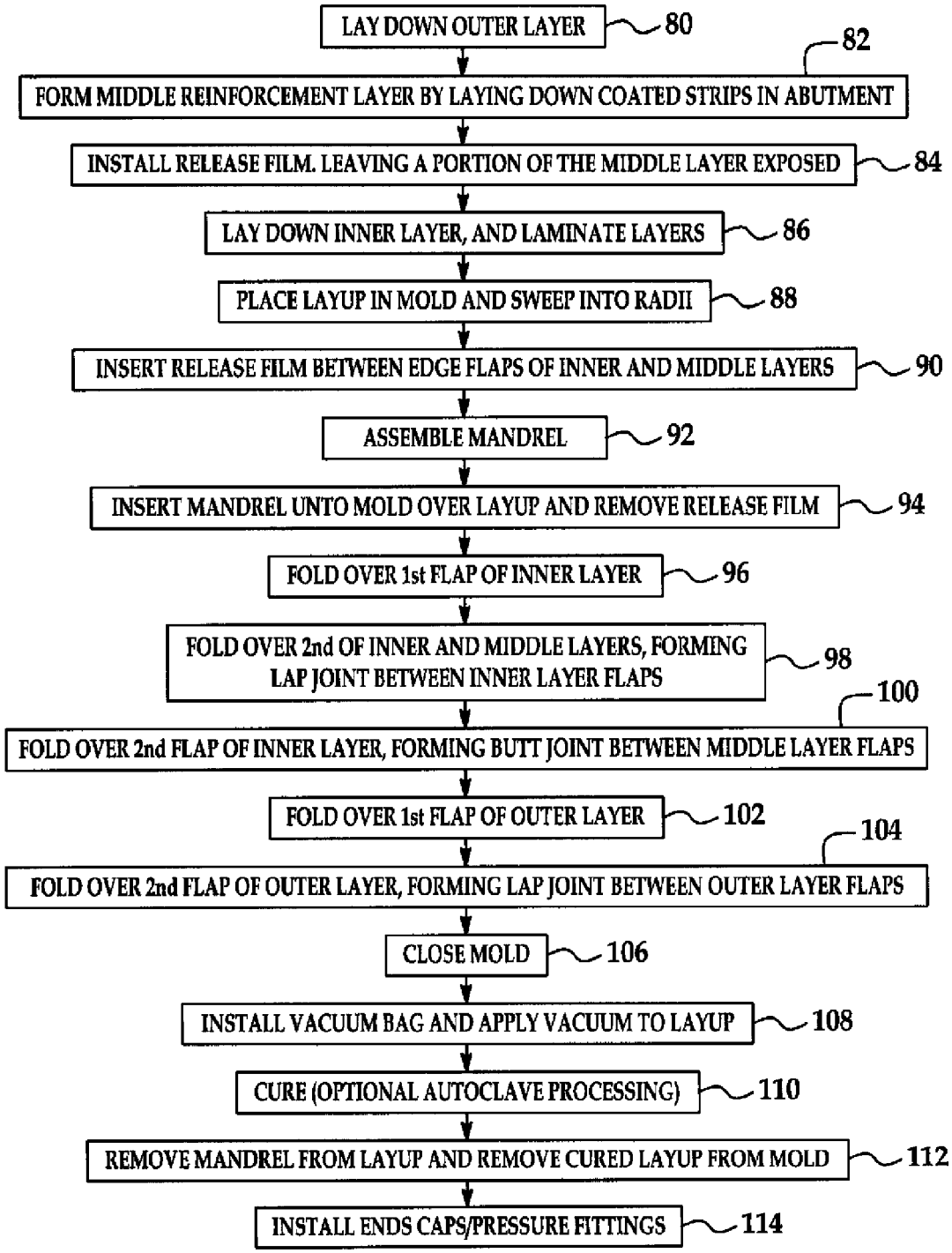
FIG. 25 is an illustration of a flow diagram of a method for making the collapsible mandrel.

FIG. 25 illustrates the overall steps of the method of making the collapsible mandrel described above. Beginning at step 80, the outer layer 44 of flouroelastic rubber is laid down on a suitable substrate 50 (FIG. 7) following which, at step 82, the middle reinforcing layer is formed by laying down rubber coated reinforcement strips 46 in side-by-side, edge-to-edge abutment with each other, aligned such that the butt joints 48 are later located respectively approximately midway between each of the sidewalls 34. At step 84, release film is installed over the reinforcement strips 46, leaving a portion of the reinforcement strips 46 exposed. Then, at step 86, the inner layer 42 of fluoroelastomeric rubber is laid down and the layup 56 is laminated using any of various techniques, including vacuum bag processing at elevated temperatures. The laminated layup 56 is then placed in the mold 60 at step 88 and is swept into the radii of the mold cavity 60*a*. Next, a release film 66 is inserted between edge flaps of the inner and middle layers 42, 49.

A forming mandrel 68 is assembled at step 92 and inserted into the mold 60 over the layup 56 at step 94, following which the release film 66 may be removed. Next, at step 96, a flap 42*a* of the inner layer 42 is folded over at step 96, following which, at step 98, a second flap 42*b* of the inner layer 42, and a flap 46*a* of the middle layer 49 are folded over, forming a lap joint 65 between these flaps. Next, at 100, a second flap 46*b* of the middle layer is folded over, forming a butt joint 48*a* between the middle layer flaps. At 102, the first flap 44*a* of the outer layer 44 is folded over, following which, at 104, the second flap 44*b* of the outer layer 44 is folded over, forming a lap joint 78 between the two outer layer flaps 44*a*, 44*b*. Then, at 106, the mold 60 is closed, and at 108, a vacuum bag is installed over the mold 60 and a vacuum is applied to the layup 56. The consolidated layup 56 may then be cured at 110, optionally using autoclave processing. At 112, the forming mandrel 68 is removed from the cured layup 56, and the layup 56 is removed from the mold 60. Finally, at 114, endwalls 34 and one or more pressure fittings 36 may be installed on the cured bladder.

Figure 26:
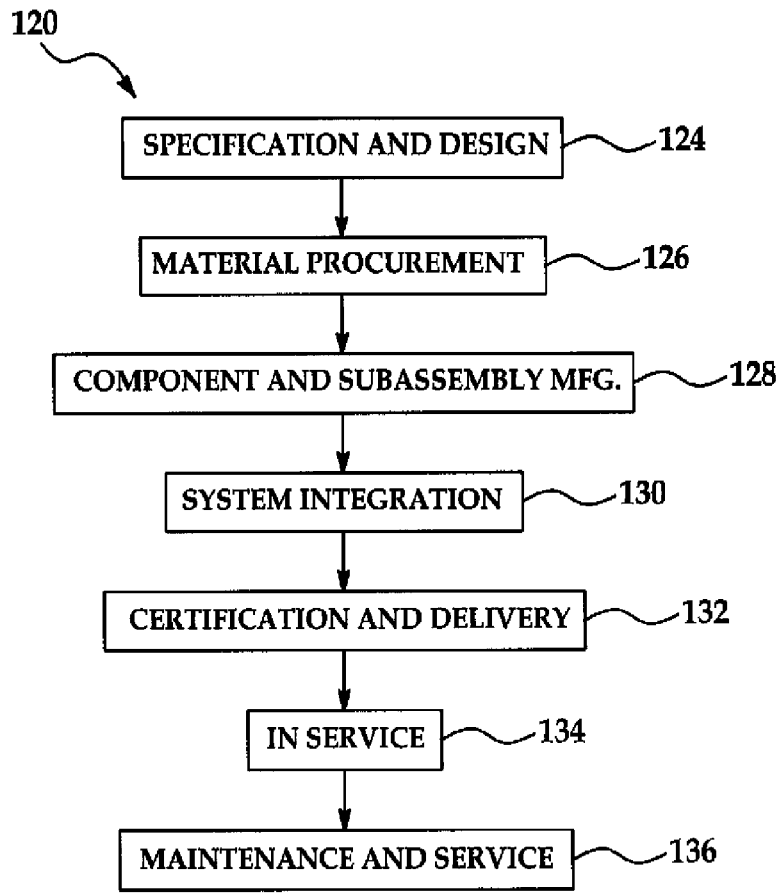
FIG. 26 is an illustration of a flow diagram of aircraft production and service methodology.
Figure 27:
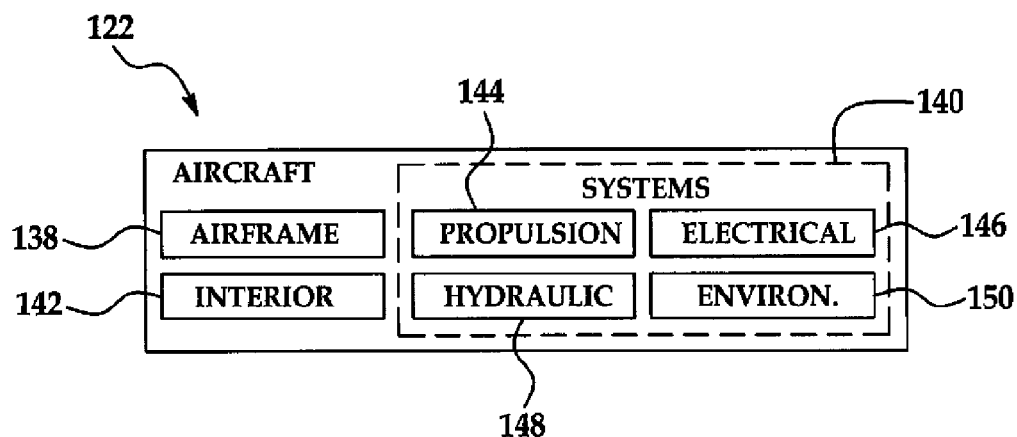
FIG. 27 is an illustration of a block diagram of an aircraft.

Embodiments of the disclosure may find use in a variety of potential applications, particularly in the transportation industry, including for example, aerospace, marine and automotive applications. Thus, referring now to FIGS. 26 and 27, embodiments of the disclosure may be used in the context of an aircraft manufacturing and service method 120 as shown in FIG. 26 and an aircraft 122 as shown in FIG. 27. Aircraft applications of the disclosed embodiments may include, for example, a wide variety of structural and non-structural composite parts and components that are generally tubular. During pre-production, exemplary method 120 may include specification and design 124 of the aircraft 122 and material procurement 126. During production, component and subassembly manufacturing 128 and system integration 130 of the aircraft 122 takes place. Thereafter, the aircraft 122 may go through certification and delivery 132 in order to be placed in service 134. While in service by a customer, the aircraft 122 is scheduled for routine maintenance and service 136 (which may also include modification, reconfiguration, refurbishment, and so on).

Each of the processes of method 120 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 27, the aircraft 122 produced by exemplary method 120 may include an airframe 138 with a plurality of systems 140 and an interior 142. Examples of high-level systems 142 include one or more of a propulsion system 144, an electrical system 146, a hydraulic system 148, and an environmental system 150. Any number of other systems may be included. The disclosed method may be employed to fabricate parts, structures and components used in the interior 142 and in the airframe 138. Although an aerospace example is shown, the principles of the disclosure may be applied to other industries, such as the marine and automotive industries.

Systems and methods embodied herein may be employed during any one or more of the stages of the production and service method 120. For example, parts, structures and components corresponding to production process 128 may be fabricated or manufactured in a manner similar to parts, structures and components produced while the aircraft 122 is in service. Also, one or more apparatus embodiments, method embodiments, or a combination thereof may be utilized during the production stages 128 and 130, for example, by substantially expediting assembly of or reducing the cost of an aircraft 122. Similarly, one or more of apparatus embodiments, method embodiments, or a combination thereof may be utilized while the aircraft 122 is in service, for example and without limitation, to maintenance and service 136.

Although the embodiments of this disclosure have been described with respect to certain exemplary embodiments, it is to be understood that the specific embodiments are for purposes of illustration and not limitation, as other variations will occur to those of skill in the art.

What is claimed:

1. A method of making composite parts, comprising:
reinforcing a flexible bladder with substantially rigid strips, the rigid strips being positioned to define a joint between the rigid strips;
inflating the bladder, the rigid strips increasing a rigidity of at least one side wall of the flexible bladder when the flexible bladder is inflated;
laying up a composite part over the reinforced inflated bladder;
deflating the bladder, the joint providing a hinge to enable a first rigid strip adjacent a second rigid strip to fold relative to the second rigid strip when the flexible bladder is deflated; and
removing the bladder from the layup.

2. The method of claim 1, wherein the reinforcing includes sandwiching the rigid strips between two layers of flexible rubber.

3. The method of claim 2, wherein the reinforcing includes placing the rigid strips in side-by-side relationship between the layers of rubber.

4. The method of claim 2, wherein the reinforcing includes coating each of the rigid strips with rubber before they are placed between the layers of rubber.

5. The method of claim 1, further comprising curing the layup before the bladder is removed from the layup.

6. The method of claim 1, wherein the reinforcing includes placing the rigid strips in sidewalls of the bladder, and deflating the bladder includes collapsing the sidewalls along the edges of the rigid strips.

7. The method of claim 1, wherein inflating the bladder is performed using positive air pressure, and deflating the bag is performed using negative air pressure.

8. A collapsible mandrel, comprising:
an inflatable bladder having collapsible side walls, the bladder including inner and outer layers of fluoroelastomeric rubber; and
a reinforcement assembly positioned between the inner and outer layers, the reinforcement assembly to increase a rigidity of the side walls, the reinforcement assembly including at least a first strip to increase rigidity along a first dimensional portion of a side wall and a second strip to increase a rigidity along a second dimensional portion of the side wall, the first and second strips positioned to form a joint between the strips where the joint is to provide a hinge to allow the first portion of the side wall supported by the first strip to swing and fold relative to the second portion of the side wall supported by the second strip when the bladder is deflated.

9. The collapsible mandrel of claim 8, wherein the reinforcement assembly includes a coating of fluoroelastomeric rubber thereon.

10. The collapsible mandrel of claim 8, wherein the first strip and the second strip are non-continuous in the sidewall.

11. The collapsible mandrel of claim 10, wherein the first strip is fiberglass.

12. The collapsible mandrel of claim 8, wherein, the bladder is elongate and each of the first and second strips is a generally rigid elongate strip positioned in the sidewall.

13. The collapsible mandrel of claim 12, wherein each of the first and second strips includes fiberglass, and each of the first and second strips is coated with fluoroelastomeric rubber.

14. The collapsible mandrel of claim 8, wherein the reinforcement assembly is collapsible.

15. The collapsible mandrel of claim 8, wherein the inflatable bladder comprises a polygonal shape or profile.

16. The collapsible mandrel of claim 15, wherein the inflatable bladder comprises a trapezoidal shape or profile.

17. The collapsible mandrel of claim 1, wherein the first and second strips are positioned longitudinally relative to a longitudinal axis of the mandrel, wherein the first and second strips do not collapse in an axial direction along the longitudinal axis of the mandrel.

18. The collapsible mandrel of claim 1, wherein the first and second strips maintain a substantially similar longitudinal length of the mandrel when the mandrel is in an inflated condition and the mandrel is in a deflated condition.

19. The collapsible mandrel of claim 1, where an upper portion of the walls of the mandrel collapse toward a lower portion of the walls of the mandrel when the mandrel is deflated.

20. The collapsible mandrel of claim 1, wherein each of the first and second strips each has a width that is substantially smaller than a longitudinal length.

21. The collapsible mandrel of claim 1, wherein the joint is provided prior to and after the bladder has been cured.

22. The collapsible mandrel of claim 1, wherein the first strip is to swing or fold relative to the second strip to deflate the mandrel after a curing process is complete.

23. A collapsible mandrel for laying up and curing composite parts, comprising:
a substantially flexible bladder adapted to inflate when pressurized, the bladder including an inner layer of rubber, an outer layer of rubber and a middle layer between the inner and outer layers of rubber, the middle layer including a substantially rigid reinforcement that provides the bladder with rigidity when the bladder is pressurized, the rigid reinforcement having a first rigid strip adjacent a second rigid strip, the first rigid strip being non-continuous relative to the second rigid strip to define a joint to enable the first rigid strip to fold along the joint relative to the second rigid strip to enable the bladder to collapse when the bladder is depressurized.

24. The collapsible mandrel of claim 23, wherein the rubber in the inner and outer layers is a fluoroelastomeric rubber.

25. The collapsible mandrel of claim 24, wherein the reinforcement is coated with a fluoroelastomeric rubber.

26. The collapsible mandrel of claim 25, wherein the reinforcement is fiberglass fabric.

27. The collapsible mandrel of claim 24, wherein the bladder is elongate, and the joint allows the reinforcement to flex when the bladder collapses.

28. The collapsible mandrel of claim 24, wherein, each of the first and second rigid strips includes fiberglass strips arranged side-by-side to form flexible butt joints allowing the reinforcement to flex.

* * * * *

UNITED STATES PATENT AND TRADEMARK OFFICE
CERTIFICATE OF CORRECTION

PATENT NO. : 8,430,984 B2  Page 1 of 1
APPLICATION NO. : 12/777610
DATED : April 30, 2013
INVENTOR(S) : Lee et al.

It is certified that error appears in the above-identified patent and that said Letters Patent is hereby corrected as shown below:

In the Claims

Column 8, line 23 claim 17, delete "1" between "claim" and "wherein" and insert --8--.
Column 8, line 28 claim 18, delete "1" between "claim" and "wherein" and insert --8--.
Column 8, line 33 claim 19, delete "1" between "claim" and "where" and insert --8--.
Column 8, line 37 claim 20, delete "1" between "claim" and "wherein" and insert --8--.
Column 8, line 40 claim 21, delete "1" between "claim" and "wherein" and insert --8--.
Column 8, line 42 claim 22, delete "1" between "claim" and "wherein" and insert --8--.

Signed and Sealed this
First Day of July, 2014

Michelle K. Lee
*Deputy Director of the United States Patent and Trademark Office*